United States Patent Office.

WILLIAM P. HAMLIN, OF EXIRA, IOWA.

Letters Patent No. 77,814, dated May 12, 1868.

IMPROVED LINIMENT.

*The Schedule referred to in these Letters Patent and making part of the same.*

TO ALL WHOM IT MAY CONCERN:

Be it known that I, WILLIAM P. HAMLIN, of Exira, in the county of Audubon, and State of Iowa, have invented a new and improved Liniment; and I do hereby declare that the following is a full, clear, and exact description thereof, which will enable those skilled in the art to make and use the same.

The object of this invention and discovery is to provide an effective and sure remedy for wounds and bruises, and for most of the pains with which mankind are afflicted, the same being designed for a family medicine, to be applied as a liniment, externally, not only on human beings, but on horses, for the cure of sprains and sores of every description.

In carrying out my invention, I use the following ingredients, in about the following proportions, and in the following manner:

One gallon of alcohol.
One-fourth pound of gum-camphor.
One-fourth pound of sugar of lead.

After the above ingredients are well mixed, or the gum-camphor and sugar of lead are well dissolved, which they will be after standing about five hours, I add one pound of concentrated water of ammonia, one quart of the best spirits of turpentine, and one pint of soft water, after which I cork the composition up, (air-tight,) and let it stand for about ten hours, after which it is ready for use.

Having thus described my invention, I claim as new, and desire to secure by Letters Patent—

A liniment, formed of the ingredients, in the proportions, and in the manner substantially as herein described.

WILLIAM P. HAMLIN.

Witnesses:
D. E. SOAR,
JOHN HUNTLEY.